Patented Mar. 23, 1937

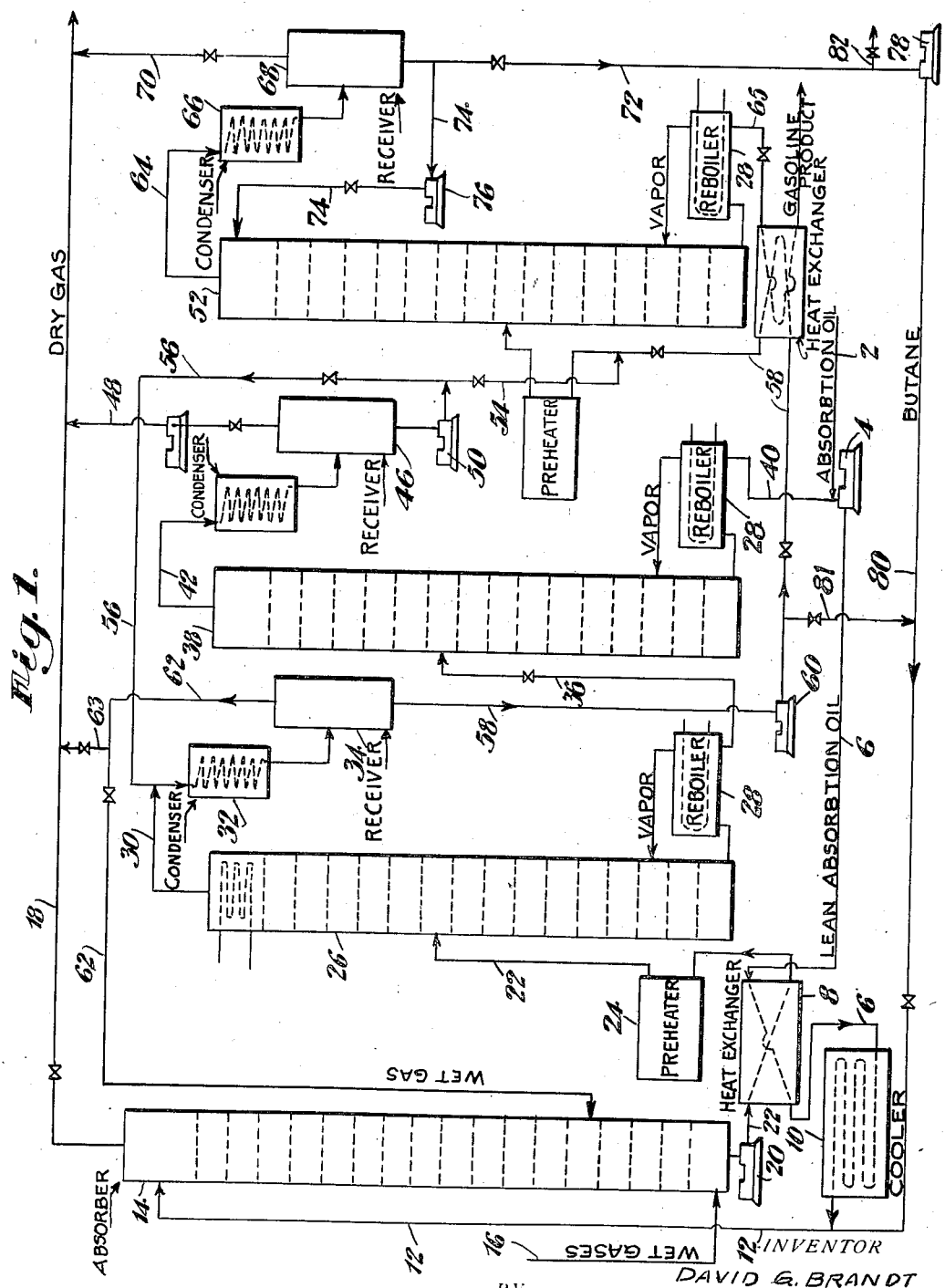

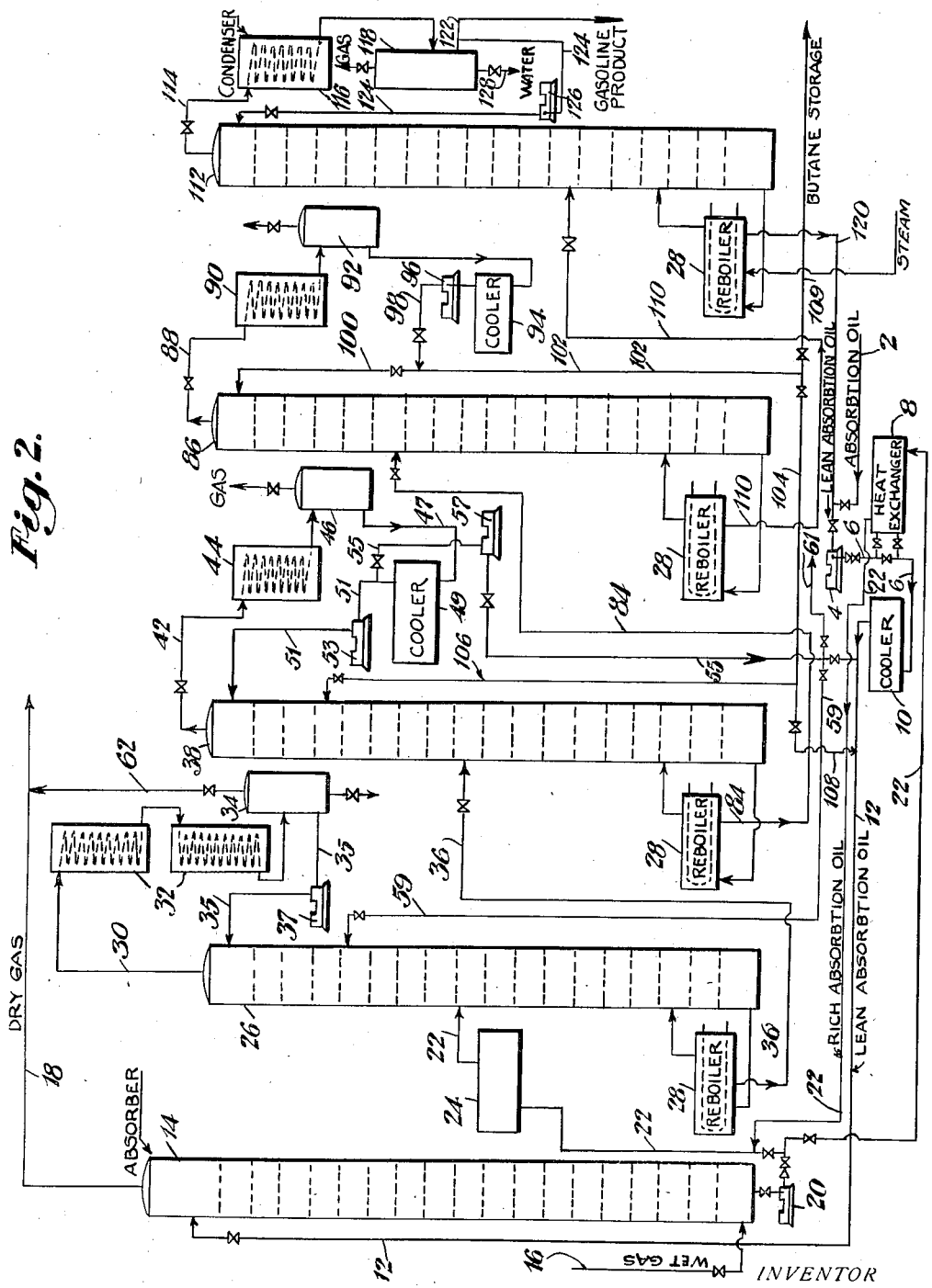

2,074,978

UNITED STATES PATENT OFFICE 2,074,978

RECOVERY AND STABILIZATION OF GASOLINE

David G. Brandt, Westfield, N. J., assignor to Doherty Research Company, New York, N. Y., a corporation of Delaware Application February 13, 1933, Serial No. 656,503

2 Claims. (Cl. 196—8)

This invention relates to a process and apparatus for producing gasoline and recovering other valuable hydrocarbons from mixtures of hydrocarbon gases by absorbing the desired constituents in a liquid absorbing medium such for example as a high boiling point absorption oil.

The present application is a continuation in part of the applicant's pending application filed July 1st, 1931, Serial No. 548,062, for "Distillation process and apparatus."

In the usual absorption process the heat developed by the latent heat of vaporization of the absorbed hydrocarbons raises the temperature of the absorption oil, which materially reduces the absorption capacity of the oil. Various methods for indirectly cooling the upper part of an absorber tower have been devised to partly overcome the defect. In accordance with the features of the present invention the heat developed in this absorber tower is held to a minimum by the addition of a relatively low boiling liquid hydrocarbon by-product to the absorption oil used therein.

The process of the present invention may be applied to the treatment of hydrocarbon gases of various kinds and from various sources. The gases treated for example may be natural gas, casing head gas, still gases, cracked gases, gases from oil cracking processes or coal retorting processes.

The primary object of the present invention is the provision of an improved process for recovering gasoline and other hydrocarbons from mixtures of hydrocarbon gases by the use of a liquid absorbing medium in which the effectiveness of the medium is increased by a novel procedure.

A further object of the invention is the provision of a process in which the operations are combined in such a way as to materially increase the effectiveness of gasoline recovery.

In general the process of the present invention includes the absorption in a liquid absorbing medium of hydrocarbons from a mixture of hydrocarbon gases such as natural gas, casing head gas and cracking still gases, the separation of a liquid fraction such as the butane or propane fraction from the constituents absorbed, and the mixing of this fraction in the form of a cold liquid with the cold absorber oil being used in the absorption step of the process. The addition of this light fraction or constituent to the absorption medium partly saturates the latter with such fraction or constituent without the usual heat of solution.

Other objects and advantages of the improved process and apparatus of the present invention will be apparent from the following detailed description taken in connection with the accompanying drawings in which:

Fig. 1 is a diagrammatic flow sheet representing apparatus adapted to carry out the process of the present invention.

Fig. 2 is a diagrammatic flow sheet representing a modified form of apparatus adapted to carry out certain modifications of the process of the present invention.

Referring to Fig. 1 of the drawings, the absorption oil for the process is introduced into the system through a feed line 2 and forced by means of a pump 4 through a line 6 by which the lean absorption oil is passed through a heat exchanger 8 and a cooler 10, to bring the oil to the desired low temperature for the absorption operation. From the cooler 10 the cold absorption oil is conducted through a line 12 into the upper part of an absorber 14. The mixture of hydrocarbon gases to be treated, and from which valuable constituents are to be absorbed, is introduced under pressure into the lower part of the absorber 14 through a line 16. The constituents in the absorber 14 may be maintained at a pressure of from 50 to 800 pounds per square inch. In the treatment of mixtures of gases containing low boiling constituents such as methane, these constituents may pass out from the upper end of the absorber through a "dry" gas line 18, unless their recovery is desired.

The rich absorption oil collecting in the bottom of absorber 14 is withdrawn through a pump 20 and forced under a pressure of about 125 pounds per square inch through a line 22 which passes through heat exchanger 8, then through a preheater 24, and finally into the mid-portion of a pressure fractionating column 26. Where the pressure in absorber 14 is higher than in 26, pump 20 is unnecessary. The tower 26 is provided with a reboiler 28 into which the liquid material reaching the bottom of the tower flows and is heated to a temperature sufficient to vaporize certain of the constituents thereof which are passed into the tower. The tower 26 is operated so that the lower boiling constituents such as ethane or propane or both are removed as vapors and conducted through a vapor line 30, a condenser 32, into a receiver 34.

The absorption oil from which the lower boiling hydrocarbons referred to have been removed, is conducted from the reboiler 28 through a valved line 36 into a low pressure fractionating tower 38 in which all of the absorbed hydrocarbons are distilled from the absorption oil at a pressure which may be approximately 10 pounds per square inch. The tower 38 is provided with a reboiler 28 and the lean absorption oil is withdrawn therefrom through a line 40 by means of pump 4, cooled and reused in the absorption operation.

The absorbed hydrocarbons distilled from the absorption oil in tower 38 are conducted through a vapor line 42 and condenser 44 into a receiver 46. Any "dry" gaseous constituents such as ethane and propane which may separate in receiver 46 are pumped therefrom through a valved gas line 48 into the "dry" gas main 18.

The liquid hydrocarbon constituents collected in receiver 46 are withdrawn by means of a pump 50 and either heated and conducted directly into a stabilizer tower 52 through a valved line 54, or all or a portion thereof conducted through a valved line 56 into contact with the vapors in line 30, passing to condenser 32. In the latter case the liquid hydrocarbon constituents may comprise the usual gasoline hydrocarbons as well as the butane fraction, absorbed from gases of the type referred to above. This mixture of liquid hydrocarbons in passing in contact with the vapors in condenser 32, absorbs any butane as well as small amounts of propane. The resulting liquid mixture as collected in receiver 34 is conducted through a line 58 and forced by means of a pump 60 through a heat exchanger and preheater, and then into the mid-portion of the stabilizing tower 52. Since the gas separated in receiver 34 may be substantially "wet", it may be passed through a valved line 62 into the lower portion of absorber 14 where certain of the constituents are taken up by the absorber oil. However, if the gas removed from receiver 34 is comparatively "dry", it may be passed directly into the dry gas main 18, through a valved line 63.

The mixture of hydrocarbon constituents introduced into tower 52 either through line 54 or 58, is subjected to a pressure fractionating operation to produce a stabilized gasoline and a substantial quantity of such constituents as butane. The gasoline product is removed from tower 52 through a reboiler 28 and passed by means of a valved line 65 in heat exchange with the distillate being passed to tower 52. The vaporized fraction in the tower 52 is withdrawn from the upper end thereof through a vapor line 64, a condenser 66 and conducted to receiver 68. The liquid material collected in receiver 68 may comprise a substantially pure butane fraction or a fraction containing largely butane with a small percentage of propane. Any "dry" gases separated in receiver 68 may be conducted to the "dry" gas main 18 by means of valved line 70. The liquid fraction recovered in receiver 68 is withdrawn through a valved line 72 and portions thereof may be used for controlling the outlet temperature in tower 52 by conducting the same through a valved line 74, in which is mounted a pump 76.

In accordance with a feature of the present invention, the fraction or part thereof withdrawn through the line 72 is conducted by means of a pump 78 and a connecting line 80 into the cold absorption medium line 12. This liquid butane fraction as shown, is mixed and blended with the cold absorption oil prior to its introduction into absorber 14, but it may be added at one or more points in the absorber. The addition of this liquid low boiling fraction to the absorption oil has the effect of cooling the oil and partially saturating the same with low boiling constituents which are not desired in the gasoline to any appreciable extent. In the upper part of the absorption tower therefore the absorption oil will be much cooler than otherwise would be the case if the low boiling fraction had not been added thereto. Furthermore portions of this low boiling liquid may be vaporized in the absorption tower, but where such is the case, the heat of vaporization will be supplied from the latent heat of vaporization (condensation) of higher boiling constituents from the gases passing upwardly through the tower. The presence, therefore, of the low boiling hydrocarbons as a liquid materially increases the efficiency of the tower and provides a novel means for cooling the absorption oil and maintaining it cold during the absorption operation. If no liquid is conducted into line 30 from receiver 46, the light fraction collected in receiver 34 may also be mixed with the cold absorption oil in line 12 by passing the fraction through lines 58, 81 and 80.

Any excess of the fraction of low boiling constituents collected in receiver 68 and withdrawn through line 72 may be removed to storage through a valved line 82.

The modification of the process as shown in Fig. 2 of the drawings is carried out in generally the same manner as that described above in connection with Fig. 1. In Fig. 2 of the drawings, the same reference numerals have been used to describe elements of the apparatus similar to those referred to in Fig. 1.

In accordance with the operation of Fig. 2 of the drawings, the absorber procedure is substantially the same as that described in connection with Fig. 1, the rich absorption oil being passed into tower 26 in which subsantially only gases such as methane and ethane are removed through the vapor line 30. However, in operating tower 26, a part of the condensate collected in receiver 34 is passed through a line 35 and pump 37 into the upper part of tower 26 to aid in controlling the outlet temperature.

Tower 38 of Fig. 2 instead of being operated at a low pressure, is operated at a high pressure and the propane fraction is removed through the vapor line 42, this fraction being collected in receiver 46 and conducted through a line 47 to a cooler 49. A part of the propane collected in cooler 49 is conducted through a line 51 by means of a pump 53 and introduced into the upper part of the tower 38 to aid in controlling the fractionation carried out therein. The remaining excess of propane is withdrawn from cooler 49 through a valved line 55 and forced by means of a pump 57 into the cold lean absorption oil in line 12. A part of the propane passed through lines 47 and 55 may also be introduced into tower 26 through a branch line 59 and any surplus propane produced in the operation may be conducted to storage through a branch line 61.

The rich absorption oil containing substantially no propane and lower hydrocarbon constituents is withdrawn from reboiler 28 of tower 38 through a valved line 84 and introduced into a third fractionating column 86, in which the butane fraction or any desired part thereof is removed from the absorption oil as vapors. The butane vapors are conducted from the tower 86 through a valved vapor line 88 and condenser 90 into a receiver 92. The butane fraction collected in receiver 92 is passed through a cooler 94 and then by means of a pump 96 to various parts of the apparatus. A part of the cold butane may be conducted through lines 98 and 100 into the upper part of tower 86 to aid in controlling the fractionation of vapors therein, and another part conducted through connecting lines 98, 102, 104 and 106 into the upper part of tower 38 to aid in the fractionation therein. However, all or any part of the butane recovered in the system may be passed through lines 98, 102, 104 and a valved connecting line 108 into the cold lean absorption oil in line 12. Any excess butane accumulated in the operation is passed to storage through a valved line 109.

The use of propane and butane fractions in the lean absorption oil introduced into tower 14 is for the same purpose as that described above in connection with the operation carried out in the apparatus illustrated in Fig. 1 of the drawings.

The rich absorption oil now containing substantially only the gasoline constituents is withdrawn from the reboiler 28 of the tower 86 through a valved line 110 into a fractionating tower 112 in which all of the remaining absorbed constituents in the absorber oil are removed as vapors through a vapor line 114 and passed through a condenser 116 into a receiver 118. The absorption oil reaching the bottom of tower 112 passes into reboiler 28 and is stripped with steam for the removal of the last traces of absorbed hydrocarbons suitable as gasoline constituents. The lean absorption oil is then returned to the absorber 14 through a line 120, pump 4, heat exchanger 8, cooler 10, and the other connecting lines referred to above. The gasoline constituents collected in receiver 118 are withdrawn therefrom through a line 122 and a portion thereof conducted through a line 124 by means of a pump 126, to the upper part of tower 112 to control the fractionation therein. Water resulting from the steam introduced into the reboiler 28 of tower 112 is collected in the bottom of receiver 118 and withdrawn through a water line 128.

The system of apparatus illustrated in Fig. 2 of the drawings may be operated under various pressure conditions of from 50 to 800 pounds per square inch, but it is preferred to operate the absorber under a pressure of at least 100 pounds per square inch. The fractionating towers 26, 38 and 86 may be operated at substantially the same or slightly reduced pressures in succession so that materials will not need to be pumped from one tower to the other. In this arrangement tower 26 may be operated at a pressure of 125 pounds per square inch or at any pressure up to 700 pounds per square inch. The reduction in pressure in the lines 36 and 84 respectively may be only sufficient to permit ready flow of the oil from tower 26 to tower 38 and from tower 38 to tower 86. The tower 112 however, may be operated at a comparatively low pressure, for example, ten pounds per square inch, which will facilitate ready removal of all of the absorbed hydrocarbons from the absorbing medium.

The proportion of the low boiling fraction or butane fraction introduced into the line 12 (Fig. 1), or of propane and/or butane fractions introduced into the line 12 (Fig. 2) may vary under different conditions depending upon the gases being treated, the type of absorbing medium being used, and the pressures employed in the absorption operation. In any case sufficient of the low boiling point material is introduced to provide the desired low temperature and where the introduced liquid material is of the nature of propane, very substantial quantities may be used. The presence of liquid propane in the absorbing medium permits the absorption of higher boiling constituents without supplying heat of condensation thereof to the absorbing medium, since such constituents are absorbed at the expense of propane which in turn is vaporized. The presence of light liquid hydrocarbon materials in the absorption oil prevents the absorption of corresponding amounts of such constituents from the gases passing through the absorber. Where a high recovery of propane is desired ethane and/or methane from receiver 34 may be mixed with the cold absorber oil (Fig. 2).

While reference herein is made to the hydrocarbon fractions mixed with the absorption oil, as being an "ethane" fraction, a "propane" fraction or "butane" fraction, it is to be understood that these fractions may comprise mixtures of saturated and unsaturated hydrocarbons of similar boiling point. The unsaturated hydrocarbons may be olefins or diolefins which boil within the ranges of temperature of such constituents as ethane, propane and butane. A fraction such as the "butane" fraction may also contain several butanes as well as unsaturated constituents of similar boiling range.

Various modifications of the process and apparatus may be made within the spirit and scope of the present invention. In fact various types of apparatus may be employed to carry out the general idea of producing a relatively light fraction which is to be mixed with the absorption oil to be used in the absorption step. Furthermore, various means may be provided for mixing with the absorption oil a light fraction of lower boiling point than the desired constituent or of higher boiling point than the gases which are not desired in the absorption oil. The light fraction to be mixed with the absorption medium may be added thereto in whole or in part at any point in the absorber to aid in temperature control, and facilitate absorption of the higher boiling constituents of the gases being treated. Portions of all fractions or constituents of lower boiling point than the lowest boiling desired product may be returned to the absorber. Where the light constituent is to be mixed with the absorption oil prior to its introduction into the absorber, the oil may be partially saturated by cooling and contact with the desired gases from any of the receivers, such as 34, 46, etc. The gases from these receivers are not diluted with the gas discharged from the absorber.

Having thus described the invention, what is claimed as new is:

1. In the process of recovering hydrocarbons from a mixture of hydrocarbon gases in which such gases are brought into intimate contact with a cool liquid absorbing medium, the improvement which comprises mixing with said cool absorbing medium prior to said contact a substantial proportion of a cooler liquid hydrocarbon fraction having a boiling point higher than the boiling point of the constituents of said gas which are not desired to be absorbed in said medium, maintaining said added liquid fraction in said absorption medium during said contact, passing the resulting rich absorption medium into a fractionating zone for the removal of lower boiling point constituents contained therein, and introducing into an intermediate point in said fractionating zone a liquid hydrocarbon fraction in addition to similar constituents contained in the rich absorption oil, said fraction having a boiling point closely adjacent to but higher than the said lower boiling point constituent to be removed, thereby to suppress the vaporization in said zone of higher boiling point constituents contained in said absorption medium.

2. In the process of recovering gasoline constituents from a gaseous hydrocarbon mixture containing such constituents as well as substantial proportions of lower boiling point hydrocarbons by absorbing the gasoline hydrocarbons in a cool liquid absorbing medium of substantially higher boiling point from which the absorbed gasoline constituents are recovered by distillation, the improvement which comprises mixing a cool liquid hydrocarbon of lower boiling point than the said desired gasoline constituents with the cool absorption medium used in the absorption operation, passing the gaseous mixture to be treated countercurrent to the absorption medium containing said added hydrocarbon, and replacing substantial proportions of said added liquid hydrocarbon in said medium with the higher boiling gasoline constituents contained in said gaseous mixture, thereby carrying out the absorption operation without substantially heating the absorption medium by heat of absorption or condensation of the said gasoline constituents.

DAVID G. BRANDT.